(12) United States Patent
Nakamura et al.

(10) Patent No.: US 7,781,068 B2
(45) Date of Patent: Aug. 24, 2010

(54) POLARIZING-PLATE-PROTECTING FILM AND POLARIZING PLATE

(75) Inventors: Norinaga Nakamura, Okayama (JP); Hiroko Suzuki, Shinagawa-Ku (JP); Tetsuo Matsukura, Koutou-Ku (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 42 days.

(21) Appl. No.: 12/063,319

(22) PCT Filed: Aug. 14, 2006

(86) PCT No.: PCT/JP2006/315997

§ 371 (c)(1),
(2), (4) Date: Feb. 8, 2008

(87) PCT Pub. No.: WO2007/020909

PCT Pub. Date: Feb. 22, 2007

(65) Prior Publication Data

US 2008/0233312 A1    Sep. 25, 2008

(30) Foreign Application Priority Data

Aug. 12, 2005    (JP) .............................. 2005-234109

(51) Int. Cl.
*B32B 23/08* (2006.01)
*B32B 23/16* (2006.01)
*B32B 27/08* (2006.01)
*B32B 27/30* (2006.01)
*B32B 27/36* (2006.01)

(52) U.S. Cl. ............... 428/481; 428/1.3; 428/337; 428/480; 428/483; 359/490; 359/491; 359/507

(58) Field of Classification Search ............... None
See application file for complete search history.

(56) References Cited

U.S. PATENT DOCUMENTS 4,759,611 A * 7/1988 Downey, Jr. ............... 349/97
6,096,375 A * 8/2000 Ouderkirk et al. ......... 427/163.1

(Continued)

FOREIGN PATENT DOCUMENTS

JP    60-101042    *    6/1984

(Continued)

OTHER PUBLICATIONS

Schimtz, Peter et al., "Films." Ullmann'S Encyclopedia of Industrial Chemistry, 5th Ed., vol. A11 (1988), pp. 85-110.*

*Primary Examiner*—Vivian Chen
(74) *Attorney, Agent, or Firm*—Burr & Brown

(57) ABSTRACT

A polarizing-plate-protecting film is provided, including a polyester film, such as a polyethylene terephthalate film, and an adhesion-facilitating layer formed on one surface of the polyester film, made of a hydrophilic cellulosic resin such as acetyl cellulose. On the other surface of the polyester film, a variety of functional layers, such as a hard coat layer, an anti-glaring layer, and an antireflection layer, are layered. The hard coat layer is a layer formed by curing, with an electron beam, an ionizing-radiation-curable resin into which an ultraviolet light absorber has been incorporated. A polyvinyl alcoholic polarizing film is laminated to the adhesion-facilitating layer of the polarizing-plate-protecting film with a water-based adhesive layer to form a polarizing plate.

6 Claims, 1 Drawing Sheet

U.S. PATENT DOCUMENTS

| | | | | |
|---|---|---|---|---|
| 6,164,785 A | * | 12/2000 | Maekawa | 359/613 |
| 6,613,426 B2 | * | 9/2003 | Onozawa et al. | 428/323 |
| 6,613,433 B2 | * | 9/2003 | Yamamoto et al. | 428/411.1 |
| 6,757,102 B2 | * | 6/2004 | Nishida et al. | 359/491 |
| 6,791,649 B1 | * | 9/2004 | Nakamura et al. | 349/137 |
| 7,006,174 B2 | * | 2/2006 | Kusumoto et al. | 349/96 |
| 7,141,298 B2 | * | 11/2006 | Shoshi et al. | 428/331 |
| 7,209,196 B2 | * | 4/2007 | Saiki et al. | 349/96 |
| 7,390,099 B2 | * | 6/2008 | Takao et al. | 359/601 |
| 2006/0110549 A1 | * | 5/2006 | Wang et al. | 428/1.3 |
| 2007/0247710 A1 | * | 10/2007 | Nakashima et al. | 359/485 |
| 2008/0266661 A1 | * | 10/2008 | Nakamura | 359/485 |

FOREIGN PATENT DOCUMENTS

| | | | |
|---|---|---|---|
| JP | 04-065095 B2 | | 10/1992 |
| JP | 06-051122 | * | 2/1994 |
| JP | 06-118232 | * | 4/1994 |
| JP | 06-118232 A1 | | 4/1994 |
| JP | 06-157791 A1 | | 6/1994 |
| JP | 08-271733 A1 | | 10/1996 |
| JP | 2001-233611 A1 | | 8/2001 |
| JP | 2003-107245 A1 | | 4/2003 |
| JP | 2004-115933 A1 | | 4/2004 |
| JP | 2005-010760 | * | 1/2005 |
| JP | 2005-010760 A1 | | 1/2005 |

* cited by examiner

POLARIZING-PLATE-PROTECTING FILM AND POLARIZING PLATE

BACKGROUND OF THE INVENTION

1. Field of the Invention

The present invention relates to a polarizing-plate-protecting film that can be placed on a polarizing film, for its protection, to form a polarizing plate, and to a polarizing plate using the polarizing-plate-protecting film.

2. Background Art

Polarizing plates are generally known for their use in liquid crystal displays (LCDs), etc. They usually use, as polarizers responsible for their property of polarizing light, polyvinyl alcoholic polarizing films, such as polyvinyl alcohol film containing adsorbed and aligned iodine. However, the polarizing films are poor in mechanical strength, so that polarizing-plate-protecting films are laminated to each side of the polarizing film with water-based adhesive layers. For the polarizing-plate-protecting films, triacetyl cellulose film is often used.

The surface of triacetyl cellulose film is poor in mar resistance. When the triacetyl cellulose film surface requires higher mar resistance, a hard coat layer is sometimes formed on the film surface by an ultraviolet-curable resin or the like (Patent Documents 1 and 2).

Although triacetyl cellulose film is excellent in optical characteristics, etc., it is at a disadvantage in that its production cost is relatively high. In order to overcome these disadvantages, it has been proposed, as a polarizing-plate-protecting film to be placed on the observation side of a polarizer, a biaxially oriented polyester film whose surface to be bonded to the polarizer is provided with a hydrophilic adhesion-facilitating layer of a polyvinyl alcoholic resin so that the polyester film can be easily bonded to the polarizer with a water-based adhesive layer. It has also been proposed that a hard coat layer, which is a hardened layer of a curable resin, or the like be further formed on the front surface of the polarizing-plate-protecting film, if necessary (Patent Document 3).

Further, it has been proposed that a special water-based adhesive such as a water-dispersible isocyanate adhesive or a crosslinkable, acetoacetyl-group-containing polyvinyl alcoholic adhesive be used to form a water-based adhesive layer with which a polarizing-plate-protecting film composed of triacetyl cellulose film, a polyester film, or the like and a polyvinyl alcoholic polarizing film are laminated (Patent Documents 4 and 5).

Patent Document 1: Japanese Patent Publication No. 065095/1992

Patent Document 2: Japanese Laid-Open Patent Publication No. 157791/1994

Patent Document 3: Japanese Laid-Open Patent Publication No. 271733/1996

Patent Document 4: Japanese Laid-Open Patent Publication No. 107245/2003

Patent Document 5: Japanese Laid-Open Patent Publication No. 010760/2005

Liquid crystal displays having polarizing plates have so far been used mainly for watches, gauge panels, and the like whose display surfaces have relatively small areas or are provided with reflection resistance of light diffusion type. In recent years, however, they have come to be used for large-screen televisions, etc. whose display areas are large or whose surfaces are provided with reflection resistance of multi-layer interference type so that the displays have glossy surfaces having low haze values. Such liquid crystal displays have the shortcoming that fringes and wavelike patterns (sometimes referred collectively to as "tatamime" (meshes-of-tatami-mat-like patterns)), scratches, stains, and so forth on the surfaces of polarizing-plate-protecting films are noticeable, so that to overcome this shortcoming has become practical necessity.

A major factor in the above-described shortcoming is that those polarizing-plate-protecting films that are now mainly used in liquid crystal displays, etc. use triacetyl cellulose film. The stain resistance of the polarizing-plate-protecting film can be improved to some extent if the film surface is provided with a hard coat layer by the use of a curable resin or the like. However, there has been a limit to improvement in mar resistance, particularly in surface toughness that is evaluated by pencil hardness, because the polarizing-plate-protecting film itself, the underlying layer of the hard coat layer, is soft. Moreover, it has been impossible for the hard coat layer to eliminate fringes and wavelike patterns that appear on the polarizing-plate-protecting film.

The shortcoming originating from triacetyl cellulose film itself can be overcome by using, as the polarizing-plate-protecting film, a polyester film such as polyethylene terephthalate film. However, the surface of a polyester film is less hydrophilic than triacetyl cellulose film, so that a polyester film cannot be firmly bonded to a polyvinyl alcoholic polarizing film with a water-based adhesive that is usually used for bonding to a polyvinyl alcoholic polarizing film. Even when the special adhesives disclosed in the above-described Patent Documents 4 and 5 are used, sufficiently high adhesion cannot be obtained between a polyester film and a polyvinyl alcoholic polarizing film, and, moreover, other special adhesive is needed to bond the two films. If a hydrophilic adhesion-facilitating layer is formed beforehand by a polyvinyl alcoholic resin on the bonding surface of a polyester film, as described in Patent Document 3, a conventional water-based adhesive can be used to bond the polyester film to a polyvinyl alcoholic polarizing film, and good adhesion can be obtained between the two films. However, since the adhesion of the hydrophilic adhesion-facilitating layer to the polyester film is poor, satisfactory adhesion cannot be obtained as a whole. Moreover, since the adhesion-facilitating layer is a hydrophilic vinyl alcoholic layer, the existing coating equipment for applying a coating diluted in an organic solvent, which is now widely used to form an adhesion-facilitating layer, cannot be used. In addition, to use the existing coating equipment, modification of the equipment, such as increasing the dryer capacity and making the equipment corrosion proof, or design change is necessary.

Further, the surface toughness required for a polarizing-plate-protecting film includes light resistance in addition to mar (scratch) resistance and stain resistance. It has been difficult to provide a polarizing-plate-protecting film with all of these properties. Namely, a typical means for providing a polarizing-plate-protecting film with mar resistance and stain resistance has been the use of a hard coat layer that is formed by cross-linking, with ultraviolet light, an ultraviolet curable resin containing acrylate monomer or the like. A typical means for providing a polarizing-plate-protecting film with light resistance has been the addition of an ultraviolet light absorber such as benzotriazole. However, it has been extremely difficult to use the two means at the same time. This is because if an ultraviolet light absorber is added to an ultraviolet curable resin, the resin unfavorably absorbs ultraviolet light applied to cure the resin.

SUMMARY OF THE INVENTION

Problems to be Solved by the Invention

In the light of the aforementioned drawbacks in the prior art, an object of the present invention is to make the surfaces of polarizing-plate-protecting films free from tatamime (fringes and wavelike patterns), scratches, photo-deterioration, etc., which have become noticeable in the recent trend toward low-haze, large-size LCD screens, and, for fulfilling this object, to provide a polarizing-plate-protecting film that can be bonded, though it uses a polyester film, to a polyvinyl alcoholic polarizing film with a water-based adhesive, like conventional triacetyl cellulose film, and that can be produced easily. Another object of the present invention is to provide a polarizing plate using such a polarizing-plate-protecting film.

Means for Solving the Problems

The present invention is a polarizing-plate-protecting film comprising a polyester film, and an adhesion-facilitating layer containing a hydrophilic cellulosic resin, being formed on one surface of the polyester film.

The polarizing-plate-protecting film having the above structure uses a polyester film in place of triacetyl cellulose film, so that its surface is free from tatamime (fringes and wavelike patterns). Further, since a hydrophilic cellulosic resin is used for the adhesion-facilitating layer, the polarizing-plate-protecting film can be bonded to a polyvinyl alcoholic polarizing film with a water-based adhesive, like conventional triacetyl cellulose film. Furthermore, a coating process using organic solvents can be employed to form the adhesion-facilitating layer, so that the existing coating equipment for applying an organic-solvent-based coating can be used as is. The polarizing-plate-protecting film can therefore be produced easily.

The present invention is the polarizing-plate-protecting film, in which the polyester film is polyethylene terephthalate film and the hydrophilic cellulosic resin is acetyl cellulose.

Since the resin for the adhesion-facilitating layer in the polarizing-plate-protecting film having the above structure is acetyl cellulose, although the polarizing-plate-protecting film contains a polyester film, it can be bonded to a vinyl alcoholic polarizing film with an water-based adhesive layer in the same manner as that in which a conventional polarizing-plate-protecting film composed of triacetyl cellulose film is bonded to a vinyl alcoholic polarizing film. Therefore, the polarizing plate production process is scarcely affected by the film material that is different from the conventional one, and the polarizing-plate-protecting film is easy to handle.

The present invention is the polarizing-plate-protecting film, in which a functional layer is provided on the other surface of the polyester film.

When the polarizing-plate-protecting film has the above structure, if a variety of known functional layers such as hard coat layers, anti-glaring layers, antistatic layers, antireflection layers, and anti-staining layers, are formed as the functional layer, the polarizing-plate-protecting film can be improved in the properties corresponding to these functional layers. For instance, when a hard coat layer is formed, since its underlying layer is the polyester film, there can be attained such higher pencil hardness that triacetyl cellulose film cannot attain.

The present invention is the polarizing-plate-protecting film, in which the functional layer is a hard coat layer that is formed by curing, with an electron beam, an ionizing-radiation-curable resin into which an ultraviolet light absorber has been incorporated.

Owing to this structure, the polarizing-plate-protecting film can be provided with not only mar resistance and stain resistance but also light resistance.

The present invention is the polarizing-plate-protecting film, in which the adhesion-facilitating layer has a multi-layered structure.

The present invention is a polarizing plate comprising a polarizing-plate-protecting film containing a polyester film and an adhesion-facilitating layer containing a hydrophilic-cellulosic resin, formed on one surface of the polyester film, and a polyvinyl alcoholic polarizing film laminated to the adhesion-facilitating layer of the polarizing-plate-protecting film with a water-based adhesive layer.

Owing to this structure, the polarizing plate can exhibit various effects originating from the polarizing-plate-protecting film.

(1) According to the present invention, the surface of the polarizing-plate-protecting film is free from tatamime (fringes and wavelike patterns), and, moreover, the polarizing-plate-protecting film can be bonded to a polyvinyl alcoholic polarizing film with a water-based adhesive, like conventional triacetyl cellulose film. Further, since the existing coating equipment suitable for applying organic-solvent-based coatings can be used as is to produce the polarizing-plate-protecting film, the production of the polarizing-plate-protecting film is easy.

(2) Further, since the hydrophilic cellulosic resin for forming the adhesion-facilitating layer is acetyl cellulose, although the polarizing-plate-protecting film is based on a polyester film, it can be bond-laminated to a vinyl alcoholic polarizing film with a water-based adhesive layer in the same manner as that in which a conventional polarizing-plate-protecting film composed of triacetyl cellulose film is bonded to a vinyl alcoholic polarizing film. The polarizing plate production process, therefore, is scarcely affected by the film material that is different from the conventional one, and the polarizing-plate-protecting film is easy to handle.

(3) Since a functional layer is layered on the other surface of the polyester film, the polarizing-plate-protecting film can exhibit improved property corresponding to the functional layer, such as a hard coat layer, an anti-glaring layer, an antistatic layer, an antireflection layer, or an anti-staining layer. For example, when a hard coat layer is formed on the polyester film, there can be attained such higher pencil hardness that conventional triacetyl cellulose film cannot attain.

(4) Since the functional layer is, in particular, a hard coat layer formed by curing, with an electron beam, an ionizing-radiation-curable resin into which an ultraviolet light absorber has been incorporated, the polarizing-plate-protecting film can be provided with not only mar resistance and stain resistance but also light resistance.

(5) Since the polarizing plate of the present invention has the above-described polarizing-plate-protecting film, it has the above-described effects that vary depending on the polarizing-plate-protecting film of the invention used in it.

DETAILED DESCRIPTION OF THE INVENTION

With reference to the accompanying drawings, the best mode for carrying out the present invention will be described hereinafter.

[Introduction]

Figure 1:
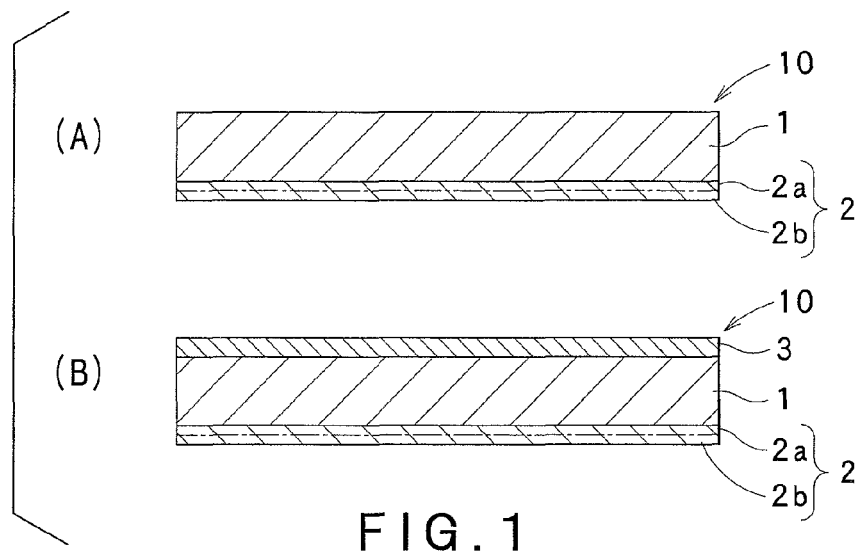
FIGS. 1(A) and 1(B) are sectional views showing two embodiments of a polarizing-plate-protecting film according to the present invention.
Figure 2:
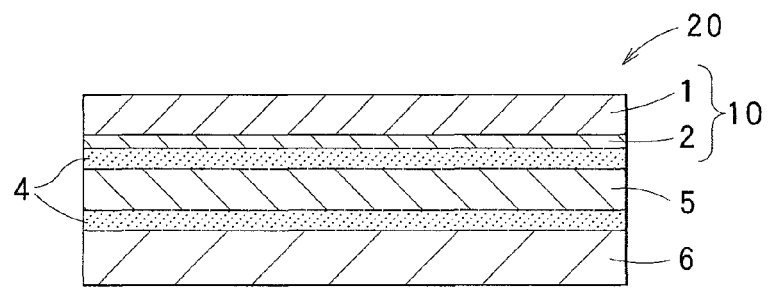
FIG. 2 is a sectional view illustrating an embodiment of a polarizing plate according to the present invention.
Figure 3:
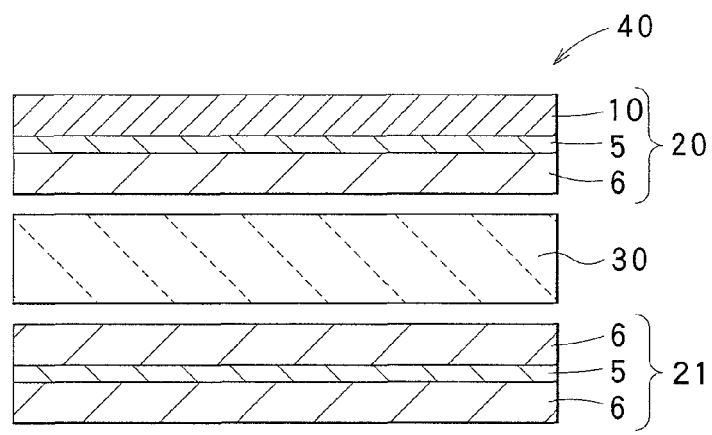
FIG. 3 is a sectional view explaining an embodiment of the application of a polarizing-plate-protecting film to a polarizing plate in the case where two polarizing plates are placed on each side of a liquid crystal cell to form a liquid crystal display.

FIG. 1 shows sectional views illustrating embodiments of a polarizing-plate-protecting film according to the present invention; FIG. 1(A) illustrates a basic structure of a polarizing-plate-protecting film, and FIG. 1(B) illustrates a structure of a polarizing-plate-protecting film which a functional layer is further layered on the polarizing-plate-protecting film shown in FIG. 1(A). FIG. 2 is a sectional view illustrating an embodiment of a polarizing plate according to the present invention. FIG. 3 is a sectional view explaining an embodiment of the application of a polarizing-plate-protecting film to a polarizing plate in the case where two polarizing plates are placed on the front and back sides of a liquid crystal cell to form a liquid crystal display.

In these figures, reference numeral 1 designates a polyester film; reference numeral 2 designates an adhesion-facilitating layer formed of a hydrophilic cellulosic resin; reference numeral 3 designates a functional layer such as a hard coat layer or an anti-glaring layer; reference numeral 4 designates a water-based adhesive layer; reference numeral 5 designates a polyvinyl alcoholic polarizing film (polarizer); reference numeral 6 designates a non-inventive, conventional polarizing-plate-protecting film composed of triacetyl cellulose film or the like; reference numeral 10 designates a polarizing-plate-protecting film 10 according to the present invention; reference numeral 20 designates a polarizing plate according to the present invention; reference numeral 21 designates a non-inventive polarizing plate; reference numeral 30 designates a liquid crystal cell; and reference numeral 40 designates a liquid crystal display.

The word "resins" herein refers basically to polymers. However, in some cases, such as in examples of ionizing-radiation-curable resins enumerated later in this specification, the "resins" encompass materials to be polymerized, such as monomers, oligomers, and prepolymers.

As illustrated in FIG. 1(A), the polarizing-plate-protecting film 10 of the present invention comprises a polyester film 1, and an adhesion-facilitating layer 2 of a hydrophilic cellulosic resin, layered on one surface of the polyester film 1 (specifically, on the surface to which a polyvinyl alcoholic polarizing film will be bonded). The hydrophilic cellulosic resin for forming the adhesion-facilitating layer 2 is acetyl cellulose, for example. As in the polarizing-plate-protecting film 10 illustrated in FIG. 1(B), a variety of known functional layers, such as a hard coat layer and an anti-glaring layer, may be layered on the other surface of the polyester film 1 on which the adhesion-facilitating layer 2 is not formed (in the figure, the upper surface of the polyester film 1).

Further, as illustrated in FIG. 2, a polarizing plate 20 of the present invention comprises the polarizing-plate-protecting film as illustrated in FIG. 1 or 2, a polyvinyl alcoholic polarizing film 5 laminated to the adhesion-facilitating layer 2 in the polarizing-plate-protecting film 10 with a water-based adhesive layer 4, and, for example, a conventional polarizing-plate-protecting film 6 laminated to the surface (the lower surface) of the polyvinyl alcoholic polarizing film 5, on the side opposite to the polarizing-plate-protecting film 10 side (the upper side), with a water-based adhesive layer 4.

The "water-based adhesive" herein refers to an adhesive that is first dissolved or emulsified in water to give an aqueous solution or emulsion, which is then applied to the adhesion-facilitating layer surface and is dried to remove water (the removal of water including a case where water passes through the polarizing film and scatters) for solidification to exhibit adhesive properties.

A liquid crystal display 40 illustrated in FIG. 3 comprises a liquid crystal cell 30, and the polarizing plate 20 of the invention, employing the polarizing-plate-protecting film 10, being placed on the observation side (the upper side in FIG. 3) of the liquid crystal cell 30. Usually, the surface profile that is unfavorable for the observation side of the liquid crystal cell 30 does not matter on the other side (the lower side) of the liquid crystal cell 30. Therefore, a non-inventive polarizing plate, e.g., a conventional polarizing plate 21, is placed on the lower side of the liquid crystal cell 30. In this figure, the polarizing plate 21 comprises a polarizing film 5 and known polarizing-plate-protecting films 6 placed on the front and back surfaces of the polarizing film 5.

The present invention will be described hereinafter in detail in due order, beginning with the explanation of the polyester film.

[Polyester Film]

The polyester film 1 is a film of polyester, and a polyester film excellent in transparency, mechanical strength, optical anisotropy, etc. is favorable as the polyester film 1. The polyester film is advantageous in that it can be formed by melt extrusion, which is a method of forming a film at low cost, unlike triacetyl cellulose film that is formed by film casting.

A known polyester capable of forming a film, selected from polyethylene terephthalate, polyethylene naphthalate, ethylene glycol-terephthalic acid-isophthalic acid copolymeric polyesters, ethylene glycol-hexamethylene dimethanol-terephthalic acid copolymeric polyesters, thermoplastic polyester elastomers, polyallylate, etc., can be used to form the polyester film. Of these polyesters, polyethylene terephthalate is particularly advantageous and preferred from the viewpoint of cost. Further, for the polyester film, oriented films such as monoaxially or biaxially oriented films are advantageous in transparency and mechanical strength over non-oriented films. Those oriented films that are less optically anisotropic, i.e., excellent in optical anisotropy, are particularly favorable because such films do not disturb the polarization of light, and, from this point of view, biaxially oriented films are preferred to monoaxially oriented films.

The thickness of the polyester film 1 can be selected, as desired, depending on the use, and it is usually from 10 to 500 μm, more usually from 25 to 300 μm, for example.

The polyester film 1 may be either a single-layer film of one polyester, or a laminate of two or more layers of the same or different polyesters.

To the polyester film 1, known additives, such as ultraviolet light absorbers and antistatic agents, may be added, as needed.

The surface of the polyester film 1 on which the adhesion-facilitating layer 2 will be formed may also be subjected to any of various treatments for improving adhesion, thereby obtaining increased adhesion strength between the polyester film 1 and the adhesion-facilitating layer 2. Examples of treatments for improving adhesion include corona discharge treatment, plasma treatment, flame treatment, and application of a variety of anchoring agents. Examples of anchoring agents useful herein include isocyanate compounds, urethane resins, and epoxy resins.

[Adhesion-Facilitating Layer]

The adhesion-facilitating layer 2 is a transparent layer useful for facilitating adhesion between the polarizing-plate-protecting film and a polarizing film when bond-laminating the two films. In the present invention, when a conventional polyvinyl alcoholic film is used as the polarizing film, and the polarizing-plate-protecting film and the polarizing film are bonded together with a water-based adhesive, the adhesion-facilitating layer 2 is particularly a layer capable of increasing the adhesion between the two films. For this reason, a hydrophilic cellulosic resin is employed for the adhesion-facilitating layer in the present invention. When bonding the polarizing-plate-protecting film and a polyvinyl alcoholic polarizing film with a water-based adhesive layer as in a conventional manner, effectively increased adhesion can be obtained owing to the hydrophilicity of the adhesion-facilitating layer 2, as compared with the case where the polyester film and the polarizing film are directly bonded. Further, it is enough for the adhesion-facilitating layer 2 to have at least such a degree of hydrophilicity that increased adhesion strength can be obtained between the polarizing-film-protecting film and the polarizing film as compared with the case where the two films are bonded without using the adhesion-facilitating layer 2.

Examples of the above-described hydrophilic cellulosic resin include lower fatty esters of cellulose represented by acetyl cellulose such as triacetyl cellulose, diacetyl cellulose and cellulose acetate propionate, and nitrocellulose. Polyvinyl alcoholic resins, etc. are generally known as hydrophilic resins. Hydrophilic cellulosic resins are the same sort of resins as triacetyl cellulose whose film has been usually used as a polarizing-plate-protecting film, so that a hydrophilic cellulosic resin film can be bond-laminated to a polyvinyl alcoholic polarizing film with a water-based adhesive in a conventional manner. To form such an adhesion-facilitating layer, although an aqueous-liquid-coating process can be used, an organic-solvent-based-liquid-coating process can also be employed, so that the existing coating equipment for applying an organic-solvent-based liquid can be used as is. In view of this point, of the hydrophilic cellulosic resins, acetyl cellulose is more preferred because it is the same sort of cellulosic resin as triacetyl cellulose whose film has been usually used as a polarizing-plate-protecting film.

For the adhesion-facilitating layer 2, a layer containing as its main resin component a hydrophilic cellulosic resin (the hydrophilic cellulosic resin content being in excess of 50% by weight of the resin content) is good enough to fulfill the purpose, and not only an adhesion-facilitating layer containing a hydrophilic cellulosic resin in an amount of 100% of the resin content, but also one containing a hydrophilic cellulosic resin and other resin as a sub-resin component, can be used. A resin properly selected with consideration for the use, the required physical properties, and so forth is used as the above other resin, and examples of such a resin include thermoplastic resins (ionizing-radiation-curing resins) such as acrylic resins, urethane resins and polyester resins, thermosetting resins, and ionizing-radiation-curable resins such as acrylate resins. Particularly, the combination use with a thermosetting polyester resin is advantageous in that it can improve the adhesion to the polyester film.

The adhesion-facilitating layer 2 may be either single-layered or multi-layered, and each layer may be formed by either a single resin or a mixture of two or more resins. Any combination can be adopted depending on the use.

For example, to form an adhesion-facilitating layer consisting of a single layer, triacetyl cellulose alone, diacetyl cellulose alone, other hydrophilic cellulosic resin, such as nitrocellulose, alone, or a mixture of different hydrophilic cellulosic resins, such as a mixture of triacetyl cellulose and diacetyl cellulose, a mixture of triacetyl or diacetyl cellulose and other hydrophilic cellulosic resin, or a mixture containing, as a main component, a hydrophilic cellulosic resin such as diacetyl cellulose and, as a sub-resin component, other resin (selected from thermoplastic resins, thermosetting resins, ionizing-radiation curable resins, etc.) is used as its resin component.

Further, to form an adhesion-facilitating layer 2 consisting of two layers 2a, 2b, triacetyl cellulose may be used to form the layer 2a on the non-bonding surface side, and diacetyl cellulose, to form the layer 2b on the bonding surface side. Alternatively, triacetyl or diacetyl cellulose may be used to form one of the two layers of the adhesion-facilitating layer 2, and other hydrophilic cellulosic resin, to form the other layer; a mixture of hydrophilic cellulosic resins other than acetyl cellulose may be used to form each layer of the adhesion-facilitating layer; or different hydrophilic cellulosic resins other than acetyl cellulose may be used to form the two layers of the adhesion-facilitating layer, provided that a single resin is used for each layer.

The present invention is not limited to the above-described combinations.

The adhesion-facilitating layer 2 may be formed by applying, with a known coating method properly selected, a coating liquid prepared by dissolving or dispersing the above-described hydrophilic cellulosic resin in a proper solvent. Although an organic solvent can be employed as the solvent, the hydrophilic cellulosic resin may also be emulsified in an aqueous solvent to form a water-based coating liquid.

Although there is no particular limitation on the thickness of the adhesion-facilitating layer, the thickness of the adhesion-facilitating layer is usually from 0.1 to 10 μm. When the adhesion-facilitating layer is too thin, the adhesion-facilitating effect cannot be surely and sufficiently obtained. On the other hand, to form an excessively thick adhesion-facilitating layer is only waste of resins.

[Functional Layer]

The functional layer 3 is one, or two or more layers that are formed on the surface of the polarizing-plate-protecting film 10, on the side opposite to the surface on which the adhesion-facilitating layer 2 is formed, i.e., on the polyester film 1 surface on the side opposite to the adhesion-facilitating layer 2 side, in order to provide additionally the polarizing-plate-protecting film 10 with one, or two or more properties selected from mechanical properties (e.g., mar resistance, surface hardness, stain resistance, etc.), electrical properties (e.g., antistatic properties), optical properties (e.g., glaring resistance, antireflection properties, compensation for anisotropy of an LCD with respect to refractive index by phase difference), and so on. Therefore, possible functional layers are specifically hard coat layers (concerning mar resistance and surface hardness), anti-glaring layers, antistatic layers, antireflection layers, anti-staining layers, retardation layers, etc., and layers selected from a variety of known functional layers can be used, as needed. A hard coat layer and some other layers will be described hereinafter in detail as representatives.

When the polyester film 1 is a laminate of two or more layers, the functional layer may be placed between the constituent layers of the laminate.

[Functional Layer: Hard Coat Layer]

The hard coat layer in the present invention refers to a layer having a hardness of "H" or more when expressed by scratch hardness determined by the so-called "Pencil Hardness Test" (pencil method) prescribed in JIS K5600-5-4 (1999) that corresponds to the old standard JIS K5400. This hardness (so-called "pencil hardness") is the hardness of a hard coat layer measured when it is in the state of being layered on a substrate film (in the present invention, the polyester film), and not the hardness of a hard coat layer in the single layer state.

Any layer can serve as the hard coat layer as long as it has the above-described hardness and transparency, and cured resin layers of a variety of curable resins such as ionizing-radiation-curable resins (ionizing-radiation-curing resins) to be cured typically with ultraviolet light (ultraviolet rays) or electron beams and thermosetting resins to be thermally cured are useful for the hard coat layer. To these curable resins, thermoplastic resins, etc. are further added, if necessary, in order to provide the hard coat layer with flexibility and other physical properties, as needed. Of the curable resins, ionizing-radiation-curable resins are typical and are advantageous in that they can form excellent hard coatings.

A known resin properly selected can be used as the above-described ionizing-radiation-curable resin. Radically polymerizable compounds having ethylenic double bonds and cationically polymerizable compounds such as epoxy compounds are typically used herein for the ionizing-radiation-curable resin. These polymerizable compounds that are in the state of monomers, oligomers, prepolymers, or the like are used singly, or two or more of them are used in combination [a combination of two or more different monomers, a combination of two or more different oligomers (or prepolymers), a combination of one monomer and one or more oligomers (or prepolymers), etc.]. Typical polymerizable compounds are a variety of acrylate compounds, which are radically polymerizable compounds. Examples of acrylate compounds that are used when they are in the relatively low molecular weight state include polyester (meth)acrylate, polyether (meth)acrylate, acryl (meth)acrylate, epoxy (meth)acrylate, and urethane (meth)acrylate.

Examples of monomers herein useful include monofunctional monomers such as ethyl (meth)acrylate, ethylhexyl (meth)acrylate, styrene, methylstyrene and N-vinylpyrrolidone, and polyfunctional (meth)acrylate monomers such as trimethylolpropane tri(meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentylglycol di(meth)acrylate.

The term (meth)acrylate herein means acrylate or methacrylate.

For curing ionizing-radiation-curable resins with electron beams, no photopolymerization initiators are needed. However, to cure them with ultraviolet light, known photopolymerization initiators are used. For example, for a radical polymerization system is used one compound selected from acetophenones, benzophenones, thioxanthones, benzoin, benzoin methyl ether, etc., or a mixture of two or more of these compounds. For a cationic polymerization system is used one compound selected from aromatic diazonium salts, aromatic sulfonium salts, aromatic iodonium salts, metallocene compounds, benzoin sulfonic esters, etc., or a mixture of two or more of these compounds.

The thickness of the hard coat layer can be selected as desired. Although the thickness of the hard coat layer may be e.g., from 0.1 to 100 μm, it is usually made from 1 to 30 μm. Further, a coating method properly selected from a variety of known ones can be employed to form the hard coat layer.

Thermoplastic or thermosetting resins, etc. are further added to the ionizing-radiation-curable resin, as needed, in order to control physical properties and so on, as desired. Examples of thermoplastic or thermosetting resins useful herein include acrylic resins, urethane resins, and polyester resins.

In order to provide the hard coat layer with light resistance (to prevent discoloration, deterioration of strength, occurrence of cracking, and the like that are caused by ultraviolet light contained in sunlight), it is preferable to add an ultraviolet light absorber (ultraviolet absorber) to the ionizing-radiation-curable resin. In the case where an ultraviolet light absorber is added to the ionizing-radiation-curable resin, it is preferable to use an electron beam to cure the ionizing-radiation-curable resin so that the ultraviolet light absorber does not prevent curing of the hard coat layer. An ultraviolet light absorber (ultraviolet absorber) selected from known ones including organic ultraviolet light absorbers such as benzotriazole compounds and benzophenone compounds, and inorganic ultraviolet light absorbers such as finely-divided zinc, titanium, or cerium oxide with particle diameters of 0.2 μm or less may be used. The ultraviolet light absorber is added to an ionizing-radiation-curable resin composition in an amount of about 0.01 to 5% by weight of the composition. For further enhancement of light resistance, it is preferable to add such a radical scavenger as a hindered amine radical scavenger to the ionizing-radiation-curable resin composition in addition to the ultraviolet light absorber. The ionizing-radiation-curable resin composition is irradiated with an electron beam at an accelerating voltage of 70 kV to 1 MV so that the absorbed dose will be about 5 to 100 kGy (0.5 to 10 Mrad).

[Functional Layer: Anti-Glaring Layer]

A known anti-glaring layer properly selected may be used in the present invention as the anti-glaring layer, and the anti-glaring layer is usually in the form of a layer of a resin in which an anti-glaring agent is dispersed. Inorganic or organic fine particles are used for the anti-glaring agent. The fine particles are spherical or ellipsoidal. Further, they are preferably transparent. Examples of such fine particles include inorganic fine particles such as silica beads, and organic fine particles such as resin beads. Examples of resin beads include styrene beads, melamine beads, acrylic beads, acryl-styrene beads, polycarbonate beads, polyethylene beads, and benzoguanamine-formaldehyde beads. The fine particles are usually added in an amount of about 2 to 30 parts by weight, preferably about 10 to 25 parts by weight, of 100 parts by weight of the resin component.

It is preferred that the above-described resin in which an anti-glaring agent is dispersed have hardness as high as possible, like the resin for forming the hard coat layer, so that curable resins such as ionizing-radiation-curable resins and thermosetting resins, as enumerated in the above description of the hard coat layer, may be used. Specific examples of curable resins useful for the anti-glaring layer, therefore, will not be enumerated again.

The thickness of the anti-glaring layer can be selected as desired, and it is usually about 1 to 20 μm. The anti-glaring layer may be formed with a coating method properly selected from a variety of known ones. It is preferable to add, as needed, a known anti-settling agent, such as silica, to a coating liquid for forming the anti-glaring layer, in order to prevent the anti-glaring agent from settling in the liquid.

[Functional Layer: Antistatic Layer]

A known antistatic layer properly selected may be used in the present invention as the antistatic layer, and the antistatic layer is usually in the form of a layer of a resin into which an antistatic agent is incorporated. An inorganic or organic compound is used as the antistatic agent. Examples of organic antistatic agents useful herein include cationic antistatic agents, anionic antistatic agents, amphoteric antistatic agents, nonionic antistatic agents, and organometallic antistatic agents. These antistatic agents may be either in the state of a low-molecular-weight compound or in the state of a high-molecular-weight compound. Electrically conductive polymers, etc. may also be used for the antistatic agent. Further, electrically conductive fine particles of metal oxides, for example, may also be used for the antistatic agent. In view of transparency, the particle diameter of electrically conductive fine particles useful herein is about 0.1 nm to 0.1 µm, for example, when expressed by mean particle diameter. Examples of the metal oxides include $ZnO$, $CeO_2$, $Sb_2O_2$, $SnO_2$, ITO (indium-doped tin oxide), $In_2O_3$, $Al_2O_3$, ATO (antimony-doped tin oxide), and AZO (aluminum-doped zinc oxide).

For the above-described resin into which the antistatic agent is incorporated, curable resins such as ionizing-radiation-curable resins and thermosetting resins as enumerated in the above description of the hard coat layer may be used. Moreover, thermoplastic resins, etc. can also be used if the antistatic layer is formed as an intermediate layer and thus the antistatic layer itself is not required to have surface hardness.

The thickness of the antistatic layer can be selected as desired, and it is usually from about 0.01 to 5 µm. The antistatic layer may be formed with a coating method properly selected from a variety of known ones.

[Functional Layer: Anti-Staining Layer]

A known anti-staining layer properly selected may be used in the present invention as the anti-staining layer, and the anti-staining layer can be formed by applying, with a known coating method, a coating containing a resin into which an anti-staining agent, e.g., a silicone compound such as silicone oil or resin, a fluorine compound such as a fluorine-containing surface active agent or fluoroplastic, or a wax, is incorporated. The thickness of the anti-staining layer can be selected as desired, and it is usually from about 1 to 10 µm.

[Functional Layer: Antireflection Layer]

A known antireflection layer properly selected may be used in the present invention as the antireflection layer. The antireflection layer is composed of at least a low-refractive-index layer; it is usually composed of multiple layers, where low-refractive-index layers and high-refractive-index layers (whose refractive indexes are higher than those of the low-refractive-index layers) are alternately layered directly one over another so that a low-refractive-index layer becomes the outermost layer on the front surface side.

The thickness of the low-refractive-index layer and that of the high-refractive-index layer may be decided properly depending on the use, and they are usually about 0.1 µm when low-refractive-index layers and high-refractive-index layers are alternately layered directly one over another. In the case where only one low-refractive-index layer is formed, its thickness is about 0.1 to 1 µm.

Examples of low-refractive-index layers include a layer of a resin into which a low-refractive-index substance such as silica or magnesium fluoride is incorporated, a layer of a low-refractive-index resin such as fluoroplastic, a layer of a low-refractive-index resin into which a low-refractive-index substance is incorporated, a thin film of a low-refractive-index substance such as silica or magnesium fluoride, formed by a thin film deposition process (e.g., a physical or chemical vapor phase epitaxial process such as vacuum deposition, sputtering, or CVD), a gel film of silicon oxide formed by a sol of silicon oxide with a sol-gel process, and a layer of a resin into which void-including fine particles are incorporated as a low-refractive-index substance.

The above void-including fine particles refer to fine particles containing therein a gas, or porous fine particles containing a gas; the apparent refractive index of such particles is, as a whole, lower than the inherent refractive index of the solid part of the fine particles, due to the gas present in the voids in the fine particles. Examples of such void-including fine particles include the fine particles of silica disclosed in Japanese Laid-Open Patent Publication No. 233611/2001. Besides inorganic substances such as silica, the hollow, fine polymer particles disclosed in Japanese Laid-Open Patent Publication No. 805031/2002 can be mentioned as the void-including fine particles.

On the other hand, examples of high-refractive-index layers include a layer of a resin into which a high-refractive-index substance such as titanium, zirconium or zinc oxide is incorporated, a layer of a high-refractive-index resin such as a fluorine-free resin, a layer of a high-refractive-index resin into which a high-refractive-index substance is incorporated, and a thin film of a high-refractive-index substance such as titanium, zirconium or zinc oxide, formed by a thin film deposition process (e.g., a physical or chemical vapor phase epitaxial process such as vacuum vapor deposition, sputtering, or CVD).

[Polarizing Plate]

The polarizing plate 20 of the present invention comprises, as shown in FIG. 2, the polarizing-plate-protecting film 10 of the invention, having the above-described structure, a polyvinyl alcoholic polarizing film 5 laminated to the adhesion-facilitating layer 2 of the polarizing-plate-protecting film 10 with a water-based adhesive layer 4, and a known protective film 6 laminated to the other surface of the polarizing film 5 with a water-based adhesive layer 4. For the purpose of protection, it is preferable to place protective films on each side of the polarizing film 5. In this case, although the above-described polarizing-plate-protecting film 10 of the invention is usually placed only on one side of the polarizing film 5, and a conventional, non-inventive polarizing-plate-protecting film such as triacetyl cellulose film, on the other side, the polarizing-plate-protecting films 10 of the invention may be placed on each side of the polarizing film 5.

An embodiment of the application of the polarizing-plate-protecting film of the present invention to a polarizing plate will now be explained with reference to the sectional view in FIG. 3 conceptually showing a liquid crystal display 40. FIG. 3 shows a liquid crystal display 40 composed of a liquid crystal cell 30, a typical display cell, and two polarizing plates 20, 21 placed on the front and back surfaces of the liquid crystal cell 30, respectively. Referring to FIG. 3 in which the upper side is the observation side of the liquid crystal cell 30, the polarizing plate 20 of the present invention is placed on the observation side of the liquid crystal cell 30, and a non-inventive polarizing plate, e.g., a conventional polarizing plate 21, is placed on the backside of the liquid crystal cell 30 (provided that the polarizer in the conventional polarizing plate 21 is not always needed to be a polyvinyl alcoholic polarizing film). Each polarizing plate 20, 21 comprises a polarizing film (polarizer) 5 and polarizing-plate-protecting films placed on each surface of the polarizing film 5, and only in the polarizing plate 20 of the present invention, the polarizing-plate-protecting film on the observation side is one according to the present invention.

Thus, in the liquid crystal display 40, the polarizing plates 20, 21 are placed on the front and back surfaces of the liquid crystal cell 30, respectively, and both surfaces of the polarizing film 5 in each polarizing plate are covered with polarizing-plate-protecting films for protection. The position of the polarizing-plate-protecting film 10 according to the present invention, relative to the polarizing film 5, may be any of the following: when the observation side and the other side are expressed simply by the upper side and the lower side, respectively, (A) on the upper side of the polarizing film 5 in the upper polarizing plate 20, (B) on the lower side of the polarizing film 5 in the upper polarizing plate 20, (C) on the upper side of the polarizing film 5 in the lower polarizing plate 21, and (D) on the lower side of the polarizing film 5 in the lower polarizing plate 21.

However, it is preferable to place the polarizing-plate-protecting film 10 in the position (A), i.e., on the upper side of the polarizing film 5 in the upper polarizing plate 20. The reason for this is as follows: the upper side of the polarizing film 5 in the upper polarizing plate 20 is exposed to external forces, so that it is required to have surface hardness; the polarizing film 5 in the upper polarizing plate 20 is close to an observer, so that tatamime appearing on its surface is most noticeable to the observer; the liquid crystal cell forms a visible image in cooperation with the polarizing film in the upper polarizing plate, so that even if the polarizing-plate-protecting film is placed on the polarizing film, the image quality is not so affected by polarized light; and when the polarizing-plate-protecting film is placed in this position (A), the degree of freedom on the selection of a film material for the polarizing-plate-protecting film becomes highest in terms of optical anisotropy with respect to polarizing property, and so forth.

It is, of course, more preferable to place the polarizing-plate-protecting film 10 in the above-described positions (A) and (B), or (C) and (D), or (A), (B), (C) and (D), and on each surface of the polarizing film 5 because by doing so, the effects of the present invention can be obtained more satisfactorily. Although only one surface of the polarizing film 5 may of course be provided with the polarizing-plate-protecting film, it is preferable to laminate the polarizing-plate-protecting films to each surface of the polarizing film 5 for the purpose of protection.

[Polyvinyl Alcoholic Polarizing Film]

The polyvinyl alcoholic polarizing film 5 is a conventional one; it is an oriented polyvinyl alcoholic film containing a dichromatic colorant such as iodine or a dichromatic dye that is adsorbed and aligned. The polyvinyl alcoholic film includes polyvinyl alcohol film, and films of copolymeric polyvinyl alcohols, modified polyvinyl alcohols, and so forth. Although the polyvinyl alcoholic film is usually monoaxially oriented, orientation is performed before, when, or after making the film adsorb a dichromatic colorant, or in two or more of these stages. For example, a polyvinyl alcoholic film is immersed in an aqueous iodine solution to make the film adsorb iodine, and the dyed film is then oriented to about three to seven times. The film that has adsorbed iodine is usually immersed in an aqueous boric acid solution. To the aqueous iodine solution and to the aqueous boric acid solution, potassium iodide is added.

The thickness of the polyvinyl alcoholic polarizing film is usually from about 5 to 80 μm.

[Water-Based Adhesive Layer]

A conventional water-based adhesive layer properly selected depending on the use, and so forth may be used in the present invention as the water-based adhesive layer 4, and a known water-based adhesive can be used to form this layer. The water-based adhesive herein refers to an adhesive that is applied after being made into liquid form, such as an aqueous solution or emulsion, and is then dried to remove water so that it exhibits adhesive properties. Typical examples of water-based adhesives are polyvinyl alcoholic adhesives. Besides these adhesives, acrylic adhesives, epoxy adhesives, urethane adhesives, and so on are included in water-based adhesives. Water-based adhesives that are cross-linkable with cross-linking agents such as isocyanate may also be used, and cross-linked layers of such adhesives may be used for the water-based adhesive layer. The water-based adhesive layer may be formed on the surface of the polyvinyl alcoholic polarizing film or of the polarizing-plate-protecting film, or on the surfaces of these films, by applying a water-based adhesive to the surface(s) with a known coating method, and with the water-based adhesive applied, the two films may be laminated to each other. In the case where protecting films are laminated to each surface of the polarizing film 5, lamination of one protecting film to one surface and that of another protecting film to the other surface may be performed either simultaneously or successively.

Although there is no particular limitation on the thickness of the water-based adhesive layer 4, the thickness of the water-based adhesive layer 4 is usually about 0.1 to 10 μm.

[Others]

The polarizing-plate-protecting film 10 of the present invention and the polarizing plate 20 using it may contain additional layers other than the above-described layers, or may be subjected to surface treatment or the like, as needed, without departing from the scope of the present invention.

EXAMPLES

The present invention will now be explained more specifically by referring to the following Examples and Comparative Examples. In the following description, "PET film" is the abbreviation for "polyethylene terephthalate film"; "TAC film", the abbreviation for "triacetyl cellulose film"; "CA", the abbreviation for "cellulose acetate (acetyl cellulose)"; "PVAPF" and "PVA polarizing film", the abbreviations for "polyvinyl alcoholic polarizing film"; and the term "polarizer" refers to a PVA polarizing film.

[Preparation of Compositions for Forming Layers]

Compositions for forming constituent layers of a polarizing-plate-protecting film and of a polarizing plate were first prepared in accordance with the following formulations.

| <Cellulosic Resin Composition A> | |
|---|---|
| Diacetyl cellulose (product No. L-50, manufactured by Daicel Chemical Industries, Ltd., Japan) | 90 parts by weight |
| Polyester polymer resin (Vylon (trademark) 220, in the form of flakes, manufactured by TOYOBO Co., Ltd., Japan) | 10 parts by weight |
| Solvent (acetone/cyclohexanone = 3/7 (weight ratio)) | 250 parts by weight |
| Irgacure (trademark) 184 (manufactured by Ciba Specialty Chemicals K.K., Japan) | 0.3 parts by weight |

In preparing this composition A, the polyester polymer resin is first dissolved in the solvent, and all the other ingredients are mixed with this solution.

<Cellulosic Resin Composition B>

| | |
|---|---|
| Diacetyl cellulose (product No. L-50, manufactured by Daicel Chemical Industries, Ltd., Japan) | 100 parts by weight |
| Solvent (acetone/cyclohexanone = 5/5 (weight ratio)) | 250 parts by weight |

<Hard-Coat-Layer-Forming Resin Composition A>

| | |
|---|---|
| Modified dipentaerythritol hexaacrylate (KAYARAD (trademark) DPCA 30, manufactured by Nippon Kayaku Co., Ltd., Japan) | 50 parts by weight |
| Isocyanuric acid EO modified triacrylate (product No. M315, manufactured by Toagosei Chemical Industry Co., Ltd., Japan) | 50 parts by weight |
| Toluene | 100 parts by weight |
| Benzotriazole ultraviolet light absorber | 3 parts by weight |

<Composition B for Forming High-Glaring-Resistant Hard Coat Layer>

| | |
|---|---|
| Pentaerythritol triacrylate | 70 parts by weight |
| Isocyanuric acid EO modified triacrylate (product No. M315, manufactured by Toagosei Chemical Industry Co., Ltd., Japan) | 30 parts by weight |
| Cellulose acetate propionate | 1.5 parts by weight |
| Silica (treated with silane coupling agent, mean particle diameter 1.5 μm) | 20 parts by weight |
| Leveling agent (product No. 10-28, manufactured by The Intec Inc., Japan) | 0.01 parts by weight |
| Toluene | 100 parts by weight |
| Cyclohexanone | 20 parts by weight |

<Composition C for Forming Low-Glaring-Resistant Hard Coat Layer>

| | |
|---|---|
| Pentaerythritol triacrylate | 20.28 parts by weight |
| Dipentaerythritol triacrylate | 8.62 parts by weight |
| Acrylic polymer (molecular weight 75000, manufactured by Mitsubishi Rayon Co., Ltd., Japan) | 3.03 parts by weight |
| Monodisperse acrylic resin beads (mean particle diameter 9.5 μm, manufactured by Nippon Shokubai Co., Ltd., Japan) | 6.39 parts by weight |
| Irgacure (trademark) 184 (manufactured by Ciba Specialty Chemicals K.K., Japan) | 1.86 parts by weight |
| Irgacure (trademark) 907 (manufactured by Ciba Specialty Chemicals K.K., Japan) | 0.31 parts by weight |
| Leveling agent (product No. 10-28, manufactured by The Intec Inc., Japan) | 0.013 parts by weight |
| Cyclohexanone | 20 parts by weight |

<Composition D for Forming Low-Glaring-Resistant Hard Coat Layer>

| | |
|---|---|
| Dipentaerythritol hexaacrylate (DPHA) | 39.3 parts by weight |
| Acrylic polymer (molecular weight 40000, manufactured by Mitsubishi Rayon Co., Ltd., Japan) | 3.13 parts by weight |
| Irgacure (trademark) 184 (manufactured by Ciba Specialty Chemicals K.K., Japan) | 1.86 parts by weight |
| Irgacure (trademark) 907 (manufactured by Ciba Specialty Chemicals K.K., Japan) | 0.31 parts by weight |
| Leveling agent (product No. 10-28, manufactured by The Intec Inc., Japan) | 0.013 parts by weight |
| Toluene | 49.35 parts by weight |
| Cyclohexanone | 5.48 parts by weight |

Example 1

Lamination [(PET/CA)/PVAPF/TAC]

A polarizing-plate-protecting film 10 with the lamination [PET film 1/cellulosic adhesion-facilitating layer 2] as shown in FIG. 1(A) was made in the following manner. Further, a polarizing plate 20 with the lamination [PET film 1/cellulosic adhesion-facilitating layer 2/water-based adhesive layer 4/polarizer 5/water-based adhesive layer 4/TAC film 6] as shown in FIG. 2 was made in the following manner, using the polarizing-plate-protecting film 10.

Non-colored, transparent, biaxially oriented PET film with a thickness of 100 μm, whose one surface had been treated to have adhesion-facilitating property (Cosmoshine A4100 (trademark), manufactured by Toyobo Co., Ltd., Japan) was prepared as the polyester film 1. The above <Cellulosic Resin Composition A> was applied to the adhesion-facilitating surface of this polyester film with a wire bar and was then dried and set in an oven at 100° C. for 30 seconds, thereby forming, on the polyester film 1, an adhesion-facilitating layer 2 of the hydrophilic cellulosic resin, having a thickness of 10 μm. Thus, the desired polarizing-plate-protecting film 10 as shown in FIG. 1(A) was produced.

Further, by the use of the polarizing-plate-protecting film 10 and a conventional polarizing-plate-protecting film 6 composed of TAC film (thickness 80 μm), a polarizing plate 20 as shown in FIG. 2 was produced.

First, the polarizing-plate-protecting film 10 and a conventional polarizing-plate-protecting film 6 were immersed in an aqueous KOH solution with a concentration of 2 mol/L, heated to 40° C., for five minutes for saponification. These films were then washed with pure water and were dried at 70° C. for 5 minutes. Subsequently, a water-based adhesive in the form of a 7% aqueous polyvinyl alcoholic solution was applied to the adhesion-facilitating layer 2 in the polarizing-plate-protecting film 10. This water-based adhesive was applied to the bonding surface of the conventional polarizing-plate-protecting film 6 composed of TAC film, as well. A PVA polarizing film 5 was bonded to the adhesion-facilitating layer 2, and the conventional polarizing-plate-protecting film 6, to the PVA polarizing film 5. Thus, there was produced a polarizing plate 20 as shown in FIG. 2, having the polarizingplate-protecting film 10 of the present invention on one side, and the conventional polarizing-plate-protecting TAC film 6 on the other side.

Example 2

Lamination [(HC/PET/CA)/PVAPF/TAC]

A polarizing-plate-protecting film 10 with the lamination [functional layer 3 (hard coat layer)/PET film 1/cellulosic adhesion-facilitating layer 2] as shown in FIG. 1(B) was made in the following manner. Further, a polarizing plate 20 with the lamination [(functional layer 3 omitted from the figure)/PET film 1/cellulosic adhesion-facilitating layer 2/water-based adhesive layer 4/polarizer 5/water-based adhesive layer 4/TAC film 6] as shown in FIG. 2 was made in the following manner, using the polarizing-plate-protecting film 10. In the description of the lamination, HC denotes a hard coat layer serving as the functional layer.

In place of the PET film used in Example 1 as the polyester film 1, non-colored, transparent PET film with a thickness of 100 μm, whose both surfaces had been treated to have adhesion-facilitating property (#100U46, manufactured by Toray Industries, Inc., Japan) was used. The above <Hard-Coat-Layer-Forming Resin Composition A> was applied to the surface of this PET film, on the side opposite to the bonding surface, with a wire bar and was then dried in an oven at 60° C. for 30 seconds to evaporate the solvent. Thereafter, to cure the dried coating, an electron beam was applied to it at an accelerating voltage of 175 KV so that the absorbed dose would be 5 Mrad. Thus, a hard coat layer with a thickness of 8 μm was formed on the PET film as the functional layer 3.

Subsequently, the above <Cellulosic Resin Composition B> was applied to the other surface, bonding surface, of the PET film in the same manner as in Example 1, thereby making the desired polarizing-plate-protecting film 10 as shown in FIG. 1(B), composed of the hard coat layer 3, the polyester film 1 and the cellulosic adhesion-facilitating layer 2.

Thereafter, the above polarizing-plate-protecting film 10 was subjected to saponification and the other steps in the same manner as in Example 1. Thus, there was produced a polarizing plate 20 with the lamination [(hard coat layer 3 omitted from the figure)/PET film 1/cellulosic adhesion-facilitating layer 2/water-based adhesive layer 4/polarizer 5/water-based adhesive layer 4/TAC film 6], as shown in FIG. 2.

Example 3

Lamination [(Low-Glaring-Resistant HC/PET/CA)/PVAPF/TAC]

A polarizing-plate-protecting film 10 with the lamination [functional layer 3 (low-glaring-resistant hard coat layer)/PET film 1/cellulosic adhesion-facilitating layer 2] as shown in FIG. 1(B) was made in the following manner. Further, a polarizing plate 20 with the lamination [(functional layer 3 omitted from the figure)/PET film 1/cellulosic adhesion-facilitating layer 2/water-based adhesive layer 4/polarizer 5/water-based adhesive layer 4/TAC film 6] as shown in FIG. 2 was made in the following manner, using the polarizing-plate-protecting film 10.

In place of the PET film used in Example 1 as the polyester film 1, non-colored, transparent PET film with a thickness of 100 μm, whose both surfaces had been treated to have adhesion-facilitating property (#100U46, manufactured by Toray Industries, Inc., Japan) was used as in Example 2. The above <Resin Composition C for Forming Low-Glaring-Resistant Hard Coat Layer> was applied to the surface of this PET film, on the side opposite to the bonding surface, with a wire bar and was then dried in an oven at 60° C. for 30 seconds to evaporate the solvent. Thereafter, to cure the dried coating, ultraviolet light was applied to it so that the integrated quantity of the light would be 30 mj/cm$^2$, thereby forming a first low-glaring-resistant hard coat layer with a thickness of 5 μm on the PET film 1 as the functional layer 3.

Subsequently, the above <Resin Composition D for Forming Low-Glaring-Resistant Hard Coat Layer> was further applied to the above low-glaring-resistant hard coat layer with a wire bar and was dried in an oven at 60° C. for 30 seconds to evaporate the solvent. To cure the coating, ultraviolet light was then applied to it so that the integrated quantity of the light would be 100 ml/cm$^2$, thereby forming a second low-glaring-resistant hard coat layer with a thickness of 4 μm on the first low-glaring-resistant hard coat layer as the functional layer 3. Thus, there was produced the desired polarizing-plate-protecting plate 2 composed of the low-glaring-resistant hard coat layer 3 consisting of the two layers of the first and second layers, the polyester film 1, and the cellulosic adhesion-facilitating layer 2, as shown in FIG. 1(B).

Subsequently, the above <Cellulosic Resin Composition B> was applied to the other surface, bonding surface, of this PET film in the same manner as in Example 1, thereby making the desired polarizing-plate-protecting film 10 composed of the low-glaring-resistant hard coat layer 3, the polyester film 1, and the cellulosic adhesion-facilitating layer 2, as shown in FIG. 1(B).

Thereafter, the above polarizing-plate-protecting film 10 was subjected to saponification and the other steps in the same manner as in Example 1. Thus, there was produced a polarizing plate 20 with the lamination [(low-glaring-resistant hard coat layer 3 omitted from the figure)/PET film 1/cellulosic adhesion-facilitating layer 2/water-based adhesive layer 4/polarizer 5/water-based adhesive layer 4/TAC film 6], as shown in FIG. 2.

Comparative Example 1

Lamination [TAC/PVAPF/TAC]

A polarizing pate with the lamination [TAC film/water-based adhesive layer/polarizer/water-based adhesive layer/TAC film] was produced.

First, two sheets of non-colored, transparent TAC film with a thickness of 80 μm (TF80L, manufactured by Fuji Photo Film Co., Ltd., Japan) were immersed in an aqueous KOH solution with a concentration of 2 mol/L, heated to 40° C., for five minutes for saponification. These films were then washed with pure water and were dried at 70° C. for 5 minutes. Subsequently, a water-based adhesive in the form of a 7% aqueous polyvinyl alcoholic solution was applied to one surface of each saponified TAC film. These TAC films were bonded to each surface of a PVA polarizing film, thereby producing a polarizing plate with the TAC films on each side.

Comparative Example 2

Lamination [(HC/TAC)/PVAPF/TAC]

A polarizing pate with the lamination [functional layer (hard coat layer)/TAC film/water-based adhesive layer/polarizer/water-based adhesive layer/TAC film] was produced.

First, <Hard-Coat-Layer-Forming Resin Composition A> was applied to one surface of non-colored, transparent TAC film with a thickness of 80 mm (TF80L, manufactured by Fuji Photo Film Co., Ltd., Japan) with a wire bar and was dried in an oven at 60° C. for 30 seconds to evaporate the solvent, as in Example 2. To cure the dried coating, ultraviolet light was applied to it so that the integrated quantity of the light would be 98 mj/cm², thereby forming a hard coat layer. Thus, there was obtained a laminate film consisting of the TAC film and the hard coat layer with a thickness of 8 µm, formed on the TAC film as the functional layer.

Subsequently, this laminate film and another TAC film with no hard coat layer were subjected to saponification as in Comparative Example 1, and a water-based adhesive in the form of a 7% polyvinyl alcoholic solution was applied to one surface of each film. These films were bonded to each surface of a PVA polarizing film, thereby producing a polarizing plate with the TAC films on each side.

Comparative Example 3

Lamination [(Low-Glaring-Resistant HC/TAC)/PVAPF/TAC]

A polarizing plate with the lamination [functional layer (low-glaring-resistant hard coat layer)/TAC film/water-based adhesive layer/polarizer/water-based adhesive layer/TAC film] was produced.

The above <Resin Composition C for Forming Low-Glaring-Resistant Hard Coat Layer> was applied to one surface of non-colored, transparent TAC film with a thickness of 80 µm (TF80L, manufactured by Fuji Photo Film Co., Ltd., Japan) with a wire bar and was then dried in an oven at 60° C. for 30 seconds to evaporate the solvent as in Example 3. Thereafter, to cure the dried coating, ultraviolet light was applied to it so that the integrated quantity of the light would be 30 mj/cm², thereby forming a first low-glaring-resistant hard coat layer with a thickness of 5 µm on the TAC film as the functional layer.

Subsequently, the above <Resin Composition D for Forming Low-Glaring-Resistant Hard Coat Layer> was applied to the above low-glaring-resistant hard coat layer with a wire bar and was dried in an oven at 60° C. for 30 seconds to evaporate the solvent. To cure the coating, ultraviolet light was then applied to it so that the integrated quantity of the light would be 100 mj/cm², thereby forming a second low-glaring-resistant hard coat layer with a thickness of 4 µm on the first low-glaring-resistant hard coat layer as the functional layer. Thus, there was obtained a laminate film composed of the TAC film on which the low-glaring-resistant hard coat layer consisting of the two layers of the first and second layers was layered.

Subsequently, this laminate film was bonded to one surface of a PVA polarizing film, and another TAC film with no hard coat layer, to the other surface of the PVA polarizing film, in the same manner as in Comparative Example 1, thereby producing a polarizing plate with the TAC films on each side.

Comparative Example 4

Lamination [(High-Glaring-Resistant HC/TAC)/PVAPF/TAC]

A polarizing plate with the lamination [functional layer (high-glaring-resistant hard coat layer)/TAC film/water-based adhesive layer/polarizer/water-based adhesive layer/TAC film] was produced.

The above <Resin Composition B for Forming High-Glaring-Resistant Hard Coat Layer> was applied to one surface of non-colored, transparent TAC film with a thickness of 80 µm (TF80L, manufactured by Fuji Photo Film Co., Ltd., Japan) with a wire bar and was then dried in an oven at 60° C. for 30 seconds to evaporate the solvent. Subsequently, to cure the dried coating, ultraviolet light was applied to it so that the integrated quantity of the light would be 98 ml/cm², thereby forming a high-glaring-resistant hard coat layer with a thickness of 3 µm on the TAC film as the functional layer. Thus, there was obtained a laminate film composed of the TAC film on which the high-glaring-resistant hard coat layer was formed.

Subsequently, this laminate film was bonded to one surface of a PVA polarizing film, and another TAC film with no hard coat layer, to the other surface of the PVA polarizing film, in the same manner as in Comparative Example 1, thereby producing a polarizing plate with the TAC films on each side.

[Performance Evaluation]

The polarizing-plate-protecting films and polarizing plates of Examples and Comparative Examples were evaluated in terms of (1) fringes and wavelike patterns, i.e., tatamime, on the surface, (2) pencil hardness, and (3) surface haze in the following respective manners. The results of evaluation are shown in Table 1.

The low- or high-glaring-resistant hard coat layer herein means a hard coat layer that has glaring resistance owing to fine irregularities present in its outermost surface, and whether a hard coat layer is high-glaring-resistant or low-glaring-resistant is determined by its surface haze originating from its surface profile. Namely, a low-glaring-resistant hard coat layer is defined as a hard coat layer with a surface haze of 0 or more and less than 13, and a high-glaring-resistant hard coat layer is defined as a hard coat layer with a surface haze of 13 or more. The upper limit of the surface haze for a high-glaring-resistant hard coat layer is 40 in view of image visibility, etc., when the use of the hard coat layer in a display is taken into consideration.

(1) Fringes and wavelike patterns (tatamime) on the surface: each one of the polarizing plates produced in Examples and Comparative Examples and other polarizing plate (specifically, a commercially available, conventional polarizing plate) were brought to the state of crossed Nicols and were bonded together with a transparent, double-coated, pressure-sensitive adhesive sheet. This laminate was placed on a horizontal plane, and the light reflected from the laminate was visually observed from an oblique direction at an angle of 45 degrees to the horizontal plane to check the presence of tatamime. The surface that is in good conditions and on which no tatamime appears is rated as good "O", and the surface on which tatamime appears is rated as no good "x".

The surfaces that were rated as good in this evaluation since no tatamime appeared on them were found to have haze values of 13 or more. Therefore, the surface haze corresponding to this haze was employed as boundary value between low glaring resistance and high glaring resistance.

(2) Pencil Hardness: measured in accordance with JIS K5400 (measuring load 1 kg).

The pencil hardness measured is not the hardness of the polarizing plate but that of the polarizing-plate-protecting film surface (when the hard coat layer is present, the hard coat layer surface) before being bonded to the polarizing film.

(3) Surface Haze: The haze prescribed in JIS K7105 (also referred to as "total haze"), measured by a reflection transmittance meter HR-100 (manufactured by Murakami Color Research Laboratory, Japan), was used when calculating the surface haze. The surface haze is not the haze of the polarizing plate but that of the polarizing-plate-protecting film surface (when the hard coat layer is present, the hard coat layer surface) before being bonded to the polarizing film.

The "surface haze" is a measure of diffusion of light that occurs due to surface irregularities and that excludes internal diffusion of light, and is a characteristic value of a film obtained by measuring the "total haze" and "internal haze" of the film separately and calculating the "surface haze" from the equation "surface haze"="total haze"−"internal haze". The "total haze" is the haze prescribed in JIS K7105, measured in accordance with this standard. The (total) haze of a film with a smooth surface, consisting of a hard coat layer or the like having glaring resistance and a conventional, transparent hard coat layer or the like having no glaring resistance, formed on the layer having glaring resistance to smooth its irregular surface, is taken as the "internal haze" originating from the internal diffusion of light.

TABLE 1

Performance Evaluation

| | Lamination Structure | tatamime | Pencil hardness | Surface haze |
|---|---|---|---|---|
| Example 1 | PET/Cellulosic adhesion facilitaing layer/laminate A | o | B | 0※ |
| Example 2 | HC/PET/Cellulosic adhesion facilitaing layer/laminate A | o | 4H | 0※ |
| Example 3 | Low-glaring-resistant HC/PET/Cellulosic adhesion facilitaing layer/laminate A | o | 4H | 0.4 |
| Comparative Example 1 | TAC/laminate A | x | 4B | 0※ |
| Comparative Example 2 | HC/TAC/laminate A | x | 2H | 0※ |
| Comparative Example 3 | Low-glaring-resistant HC/TAC/laminate A | x | 3H | 0.4 |
| Comparative Example 4 | High-glaring-resistant HC/TAC/laminate A | ◯ | 2H | 25 |

In Table 1,
※since the substrate itself is slightly cloudy, the haze from which the internal haze is subtracted was taken as the surface haze.
HC: hard coat layer
PET: polyethylene terephthalate (film)
TAC: triacetyl cellulose (film)
laminate A: [water-based adhesive layer/PVA polarizing film/water-based adhesive layer/TAC]

The surface haze values of the polarizing plates of Examples 1 to 3 are low, but tatamime on the surfaces of these polarizing plates is unnoticeable, as shown in Table 1. On the other hand, in the polarizing plates of Comparative Examples 1 to 3, when the surface haze is low, tatamime on the surface is noticeable. Exceptionally, tatamime on the surface of the polarizing plate of Comparative Example 4 is unnoticeable. This is because the surface haze of this polarizing plate is as high as 25. The polarizing plates of Examples were confirmed to be suitable to form low-surface-haze faces such as glossy faces. All the polarizing plates of Examples and Comparative Examples were improved in pencil hardness when they were provided with a hard coat layer. However, when provided with a hard coat layer, the polarizing plates of Examples, using PET film, had higher pencil hardness than those of Comparative Examples, using TAC film (Example 2 vs. Comparative Example 2, and Example 3 vs. Comparative Example 3).

No trouble occurred in bonding the polarizing-plate-protecting films with the water-based adhesive layer.

The invention claimed is:

1. An observation side polarizing plate comprising:
   a polarizing film; and
   a pair of polarizing-plate-protecting films laminated on an observation side of the polarizing film and on an opposite side of the polarizing film, respectively, through water-based adhesive layers;
   wherein the polarizing-plate-protecting film on the observation side of the polarizing film comprises
      a polyester film comprising a biaxially oriented polyethylene terephthalate film having a thickness of 25-300 μm, and
      an adhesion-facilitating layer containing a hydrophilic acetyl cellulose resin and a thermosetting polyester resin, formed on the polarizing film side of the polyester film,
   wherein a content of the hydrophilic acetyl cellulose resin is more than 50% by weight of a total resin content of the adhesion-facilitating layer.

2. The observation side polarizing plate according to claim 1, further comprising a functional layer provided on the surface of the polarizing film opposite the polyester film.

3. The observation side polarizing plate according to claim 2, wherein the functional layer is a hard coat layer that is formed by curing, with an electron beam, an ionizing-radiation-curable resin into which an ultraviolet light absorber has been incorporated.

4. The observation side polarizing-plate-protecting film according to claim 2, wherein the functional layer comprises an anti-glaring layer comprising a resin layer in which inorganic and organic fine particles are dispersed, wherein the inorganic fine particles comprise silica beads, wherein the organic fine particles comprise at least one of styrene beads, melamine beads, acrylic beads, acryl-styrene beads, polycarbonate beads, polyethylene beads, and benzoguanamine-formaldehyde beads, and wherein the inorganic and organic fine particles are added in an amount of about 2 to 30 parts by weight of 100 parts by weight of the resin component.

5. The observation side polarizing plate according to claim 1, wherein the adhesion-facilitating layer has a multi-layered structure.

6. The observation side polarizing-plate-protecting film according to claim 1, wherein the hydrophilic acetyl cellulose resin is prepared using a solvent of acetone and cyclohexanone.

* * * * *